F. I. TONE.
BRAKE EQUALIZING DEVICE.
APPLICATION FILED MAY 7, 1913.

1,298,831.

Patented Apr. 1, 1919.
2 SHEETS—SHEET 1.

Witnesses
Chas. N. Leonard.

Inventor
Fred I. Tone
Attorneys

F. I. TONE.
BRAKE EQUALIZING DEVICE.
APPLICATION FILED MAY 7, 1913.

1,298,831.

Patented Apr. 1, 1919.
2 SHEETS—SHEET 2.

Witnesses
Chas. N. Leonard.
A. C. Rue

Inventor
Fred I. Tone
by Bradford & Davlett
Attorneys

UNITED STATES PATENT OFFICE.

FRED I. TONE, OF INDIANAPOLIS, INDIANA.

BRAKE-EQUALIZING DEVICE.

1,298,831.  Specification of Letters Patent.  Patented Apr. 1, 1919.

Application filed May 7, 1913. Serial No. 766,222.

*To all whom it may concern:*

Be it known that I, FRED I. TONE, a citizen of the United States, residing at Indianapolis, Marion county, and State of Indiana, have invented and discovered certain new and useful Improvements in Brake-Equalizing Devices, of which the following is a specification.

My invention relates to tension equalizing devices for mechanisms or structures in which a load is to be applied from one member to another. The invention has particular applicability to equalizing means for brakes and especially brakes for automobiles.

The object of the invention is to provide means to enable the brake load to be applied equally to both of a pair of brakes whereby an equal and uniform pressure may be exerted by each brake notwithstanding inequalities in the wearing surfaces thereof or slight differences in the leverage of the respective operating parts.

The invention comprises means for automatically equalizing the load when the brakes are operated and also means for obtaining a fixed adjustment of the relative throw of the brake rods.

With the above objects in view my invention is embodied in preferable form in the device hereinafter described and illustrated in the accompanying drawings.

Figure 1:
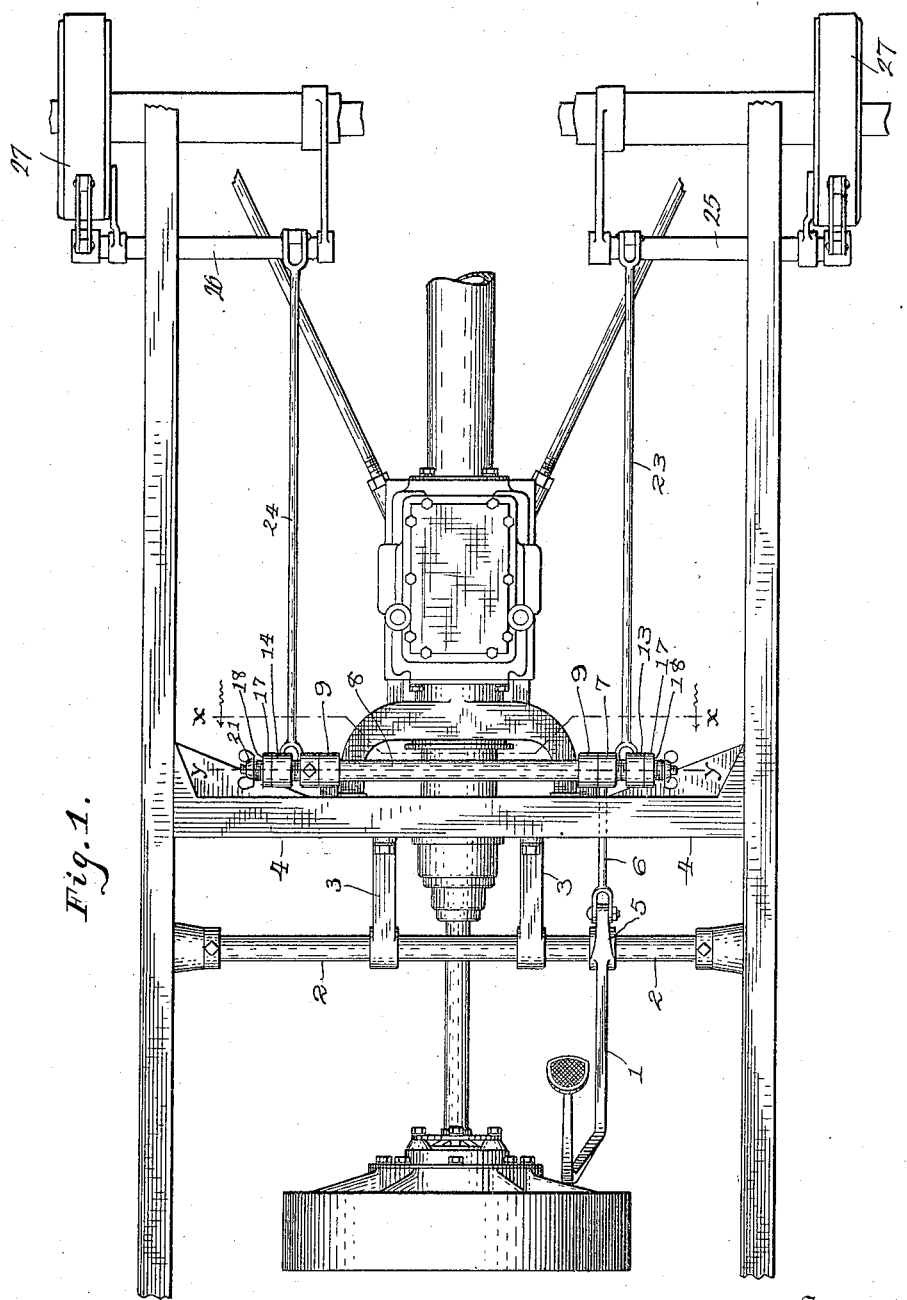
Figure 2:
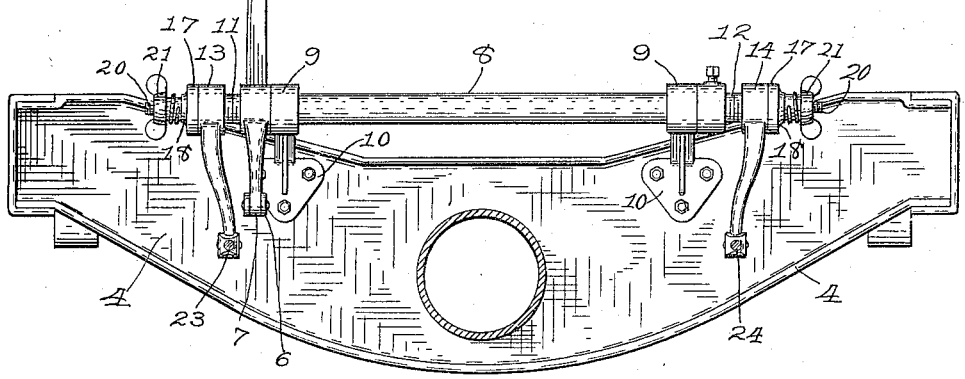
Figure 3:
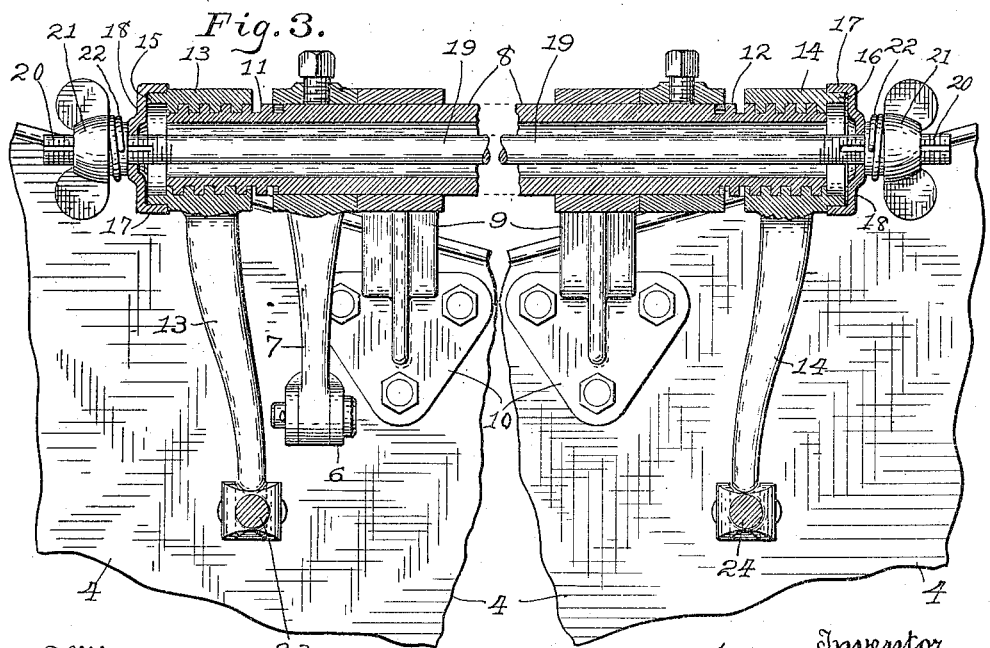

In these drawings, Figure 1 is a top plan view of a part of a chassis of an automobile showing my invention applied thereto; Fig. 2 a detail view in elevation of the equalizing tube looking toward the front of the automobile and taken on the section *x—x* of Fig. 1; Fig. 3, an enlarged view similar to Fig. 2 and showing the equalizing mechanism in vertical section, such section being taken on the line *y—y* of Fig. 1.

Referring to the drawings, 1 is a brake pedal lever of the usual construction, the rear end of which is pivoted on a rotatable shaft 2, extending across the chassis and suitably braced by arms 3 extending from the frame 4 adapted to support the transmission shaft. Fixed on the pedal lever is a radius arm 5 to the end of which is pivoted a link 6. This link is connected to the lower end of an oscillating power transmitting crank 7. This crank arm is fixed on a tube 8 by means of a suitable key. The tube 8 is mounted for rotative movement in brackets 9, attached to members 10 which are fixed to the frame 4.

The tube 8 is provided at opposite ends with two series of exterior left hand and right hand screw threads 11 and 12 respectively. Mounted on the tube and engaging these threads are the interiorly threaded ring shaped hubs of oscillatory radius arms 13 and 14 respectively. These hubs are provided with longitudinally extending annular sleeves 15 and 16 respectively. Each sleeve fits freely within a lip 17 and against the inner face of a cap 18, at each end of the tube.

These caps loosely surround and support a solid rod 19 extending through the tube and provided with threaded portions 20 at its ends. A winged nut 21 engages each of these threaded portions and is provided with a locking spring washer 22, one end of which engages a longitudinal slot formed in the end of the rod 19. By means of the nuts, the caps 18 may be moved relatively to the rod 19 lengthwise thereof and thus adjusted and tightened against the hubs of the radius arms 13 and 14 for the purpose of limiting the relative travel of the heads and tube 8 on their respective screw threads, and of fixing the angle to the vertical at which the said arms project, so as to take up lost motion between the arms and the brakes. The rod 19 is supported solely by the caps 18 and is free to move longitudinally of the tube 8; hence the hub of the radius arm, the cap and the winged nut at one end of the rod cannot be jammed tightly together unless such parts at the other end of the rod are also jammed tightly together. If the heads of the radius arms 13 and 14 are jammed tightly against the caps 18 so that the radius arms are rigidly connected through the tension rod 19, then both arms will be oscillated in unison when the crank 7 is oscillated. If, however, either of the radius arms is not jammed tightly against the cap 18 then the screw threads on the tube will force the hub outwardly until it is forced tightly against the cap, whereupon the radius arms will move in unison. If any part of the connection between the radius arms and the brakes or other appliances to which a load is to be applied has become worn or loose then the radius arm corresponding to such connection must be adjusted on the tube at a less angle thereto than the other arm so as to compensate for this lost motion and this is done by turning the radius arm on the tube and then tightening its cap 18 against the hub of the arm. The rigid rod 19 holds the caps and hubs firmly together after the adjustment has been obtained and thus serves to rigidly connect the two radius arms.

The rod 19 and the tube 8 constitute a tension member adapted to transmit the strain of the load from one end to the other for the purpose of equalizing the load applied to the radius arms 13 and 14 which are connected to the brake rods.

To the lower ends of these arms 13 and 14 are pivoted respectively the brake rods 23 and 24, which are of the usual construction and are adapted to connect with separate brake actuating shafts 25 and 26 which are connected to the brakes 27.

In the operation of the device when the brake lever pedal is depressed, the lever 5 will be rocked on the shaft 2, thereby pulling forwardly the link 6 which is connected to the crank arm 7. When the tube is turned, should there be any wear between the lower end of either of the radius arms and the braking surfaces so that one brake will contact against its complementary braking surface before the other brake then the rotating movement of the tube will be transmitted to the screw threads on the heads of the radius arms, and the radius arms 13 and 14 will be caused to travel relatively to the tube on the screw threads, thus forcing the hub of the radius arms outwardly against the caps 18, whereupon an equal tension will be applied to both radius arms. Upon the continued rotation of the tube, the radius arms will be oscillated and in such movement, both arms will be moved equidistantly and under the same pressure, thus equalizing the load applied to the brakes. Should the brake shoe corresponding, for instance, to the right hand radius arm be worn more than the brake shoe corresponding to the left hand radius arm, the said right hand arm will have a greater transverse travel on the tube, owing to this lost motion and no load will be imparted through the rod to the left hand radius arm until the first arm has traveled transversely a sufficient distance to put a tension upon the tension rod 19.

In order to obtain a quick adjustment of the radius arms 13 and 14 so that the angular relation of the arms to their pivots, whereby the distance between the brakes and the arms when in their state of rest, may be altered so as to compensate for any considerable degree of wear on the brakes or either of them, the winged nuts are screwed up against the caps. This action draws the rod toward the cap against which bears the nut that is being turned jamming the nut, rod, caps and radius arms together, whereupon in continuous rotation of the nut the radius arms will be caused to turn on the tube so as to throw them away from the brakes, and lessen their normal angle to the vertical crank arm, whereby any lost motion between the radius arms and brakes may be taken up. Owing to the fact that separate sets of threads for each arm are provided and located adjacent the ends of the tube to obtain the relative compensating movement between the arms and rod, it will be seen that such means are substantially in the planes in which the respective arms swing, so that there is a direct application of the force through the hubs of the arms from the ends of the rod and bearing tube and thus deflection of the tube and rod reduced to a minimum and any loss of equalizing effect due to deflection avoided.

Having thus described my invention, what I claim is:

1. In combination with separate power transmitting lever arms for a plurality of load-receiving devices, a common lever arm for applying power to said transmitting arms, a horizontal longitudinally movable tension rod, means to connect said power transmitting arms rigidly to said tension rod, a hollow rotatable member in which said rod is mounted and on which said arms are mounted, said arms being movable in vertical planes for the purpose of applying and transmitting the power to said devices.

2. In combination with separate power transmitting lever arms for a plurality of brakes, a power applying lever arm, a hollow shaft on which all of said arms are mounted and the axis of which forms the common axis for said arms, said arms being movable in vertical planes, a tension rod extending through said hollow shaft and movable freely longitudinally thereof and means carried by said shaft for forcing said transmitting lever arms against the ends of said rod to rigidly connect said arms to thereby transmit an equal force to their respective brakes.

3. In combination with separate operating radius arms for a plurality of brakes, a rotatable arm-operating tube, oppositely directed screw threads on the opposite ends of said tube engaged by the respective arms, a rod extending through said tube, caps mounted against said arms, and adjustable means mounted on said rod at each end thereof and operable to exert pressure on said caps, substantially as described.

4. In combination with separate oscillatory brake operating arms, a common member having screw threads thereon at each end to receive threaded portions of the respective arms, a tension rod extending through said member, adjustable arm-clamping means through which said rod extends said rod having threaded portions, and adjustable nuts engaging said threaded means and operable to exert pressure on said clamping means to move said rod and rotate the arms on the supporting member, substantially as described.

In witness whereof I have hereunto set my hand and seal at Indianapolis, Indiana, this 28th day of March, A. D. nineteen hundred and thirteen.

FRED I. TONE. [L. S.]

Witnesses:
A. C. RICE,
W. P. DOOLITTLE.

Copies of this patent may be obtained for five cents each, by addressing the "Commissioner of Patents, Washington, D. C."